United States Patent
Merrin et al.

(10) Patent No.: US 10,703,658 B2
(45) Date of Patent: Jul. 7, 2020

(54) HOME SEWAGE TREATMENT SYSTEM

(71) Applicant: TANGENT COMPANY LLC, Chagrin Falls, OH (US)

(72) Inventors: John Merrin, Lisbon, OH (US); Travis Genshock, Chagrin Falls, OH (US); Brendan Matheny, Solon, OH (US); Paul Wadham, Avon Lake, OH (US); Adam Arnold, Aurora, OH (US)

(73) Assignee: TANGENT COMPANY LLC, Chagrin Falls, OH (US)

(*) Notice: Subject to any disclaimer, the term of this patent is extended or adjusted under 35 U.S.C. 154(b) by 112 days.

(21) Appl. No.: 15/729,200

(22) Filed: Oct. 10, 2017

(65) Prior Publication Data

US 2018/0251389 A1   Sep. 6, 2018

Related U.S. Application Data

(60) Provisional application No. 62/467,479, filed on Mar. 6, 2017.

(51) Int. Cl.
*C02F 3/30* (2006.01)
*C02F 3/20* (2006.01)
(Continued)

(52) U.S. Cl.
CPC ............... *C02F 3/30* (2013.01); *C02F 3/006* (2013.01); *C02F 3/06* (2013.01); *C02F 3/121* (2013.01);
(Continued)

(58) Field of Classification Search
CPC ........ C02F 3/30; C02F 3/1247; C02F 3/2826; C02F 3/121; C02F 3/1273; C02F 3/06;
(Continued)

(56) References Cited

U.S. PATENT DOCUMENTS 3,472,765 A   10/1969  Budd
3,873,445 A    3/1975  Bussard
(Continued)

FOREIGN PATENT DOCUMENTS

EP   1813579 A1   8/2007
EP   2952483 A1  12/2015
(Continued)

OTHER PUBLICATIONS

The International Search Report and Written Opinion issued in corresponding International PCT Application No. PCT/US2017/055888; dated Jan. 25, 2018.
(Continued)

*Primary Examiner* — Nam X Nguyen
*Assistant Examiner* — Julia L. Wun
(74) *Attorney, Agent, or Firm* — Pearne & Gordon LLP

(57) ABSTRACT

A tank is disclosed as having a tub therein that divides the volume of the tank into an anoxic chamber inside the tub and an equalization chamber outside of the tub. The anoxic chamber anoxically treats wastewater while the equalization chamber equalizes fluctuations in wastewater influent as well as provides a holding space for wastewater if power to the tank is cut off. The tank can be part of a system for treating wastewater, such as one with an anaerobic tank having an anaerobic chamber for anaerobically treating wastewater, an aerobic/filtration tank having a filtration sub-tank therein that divides the volume of the tank into a filtration chamber inside the sub-tank and an aerobic chamber outside of the sub-tank. The aerobic chamber can aerobically treat wastewater while the filtration chamber has a membrane unit for filtering wastewater.

19 Claims, 7 Drawing Sheets

(51) Int. Cl.
*C02F 3/00* (2006.01)
*C02F 3/12* (2006.01)
*C02F 3/06* (2006.01)
*C02F 3/28* (2006.01)

(52) U.S. Cl.
CPC .......... *C02F 3/1247* (2013.01); *C02F 3/1273* (2013.01); *C02F 3/208* (2013.01); *C02F 3/2826* (2013.01); *C02F 2209/42* (2013.01); *Y02W 10/15* (2015.05)

(58) Field of Classification Search
CPC ...... C02F 3/208; C02F 3/006; C02F 2209/42; Y02W 10/15
USPC ........ 210/137, 601–605, 615, 616, 620–624, 210/630, 744
See application file for complete search history.

(56) References Cited

U.S. PATENT DOCUMENTS

| | | | |
|---|---|---|---|
| 3,950,249 A | 4/1976 | Eger et al. | |
| 3,964,998 A | 6/1976 | Barnard | |
| 4,145,279 A | 3/1979 | Selby, III | |
| 4,210,528 A | 7/1980 | Coviello et al. | |
| 4,246,101 A | 1/1981 | Selby, III | |
| 4,350,587 A | 9/1982 | Jarrell | |
| 4,439,317 A | 3/1984 | Jarrell | |
| 4,812,237 A | 3/1989 | Cawley et al. | |
| 5,622,622 A | 4/1997 | Johnson | |
| 5,738,781 A | 4/1998 | Carlson | |
| 5,776,344 A | 7/1998 | McCarty et al. | |
| 5,874,003 A | 2/1999 | Rose | |
| 5,961,830 A | 10/1999 | Barnett | |
| 6,074,551 A | 6/2000 | Jones et al. | |
| 6,139,744 A | 10/2000 | Spears et al. | |
| 6,190,554 B1 | 2/2001 | Mandt | |
| 6,299,775 B1 | 10/2001 | Elston | |
| 6,312,599 B1 | 11/2001 | Reid | |
| 6,379,546 B1 | 4/2002 | Braun | |
| 6,383,369 B2 | 5/2002 | Elston | |
| 6,398,957 B1 | 6/2002 | Mandt | |
| 6,406,629 B1 | 6/2002 | Husain et al. | |
| 6,524,481 B2 | 2/2003 | Zha et al. | |
| 6,635,177 B2 | 10/2003 | Oswald et al. | |
| 6,676,836 B2 | 1/2004 | Mandt | |
| 6,838,000 B2 | 1/2005 | Braun | |
| 6,884,350 B2 | 4/2005 | Muller | |
| 6,955,762 B2 | 10/2005 | Gallagher et al. | |
| 6,974,544 B1 | 12/2005 | Langlais | |
| 7,226,541 B2 | 6/2007 | Muller et al. | |
| 7,279,100 B2 | 10/2007 | Devine | |
| 7,294,272 B2 | 11/2007 | Ames et al. | |
| 7,300,022 B2 | 11/2007 | Muller | |
| 7,323,107 B2 | 1/2008 | Ames et al. | |
| 7,396,453 B1 | 7/2008 | Probst | |
| 7,407,580 B2 | 8/2008 | You et al. | |
| 7,648,634 B2 | 1/2010 | Probst | |
| 7,662,212 B2 | 2/2010 | Mullette et al. | |
| 7,662,288 B2 | 2/2010 | Yamasaki et al. | |
| 7,666,300 B2 | 2/2010 | Cormier et al. | |
| 7,749,384 B2 | 7/2010 | Patton et al. | |
| 7,785,469 B2 | 8/2010 | Maclean | |
| 7,867,417 B2 | 1/2011 | Mullette | |
| 7,988,891 B2 | 8/2011 | Muller et al. | |
| 8,012,352 B1 | 9/2011 | Giraldo et al. | |
| 8,057,574 B2 | 11/2011 | Mullette et al. | |
| 8,092,678 B2 | 1/2012 | Ott | |
| 8,262,778 B2 | 9/2012 | Mullette et al. | |
| 8,268,176 B2 | 9/2012 | Johnson et al. | |
| 8,282,818 B1 | 10/2012 | Dobie et al. | |
| 8,377,305 B2 | 2/2013 | Zha et al. | |
| 8,394,271 B2 | 3/2013 | Dvorak | |
| 8,512,568 B2 | 8/2013 | Zha et al. | |
| 8,535,532 B2 | 9/2013 | Ott | |
| 8,721,887 B2 | 5/2014 | Daigger et al. | |
| 8,758,622 B2 | 6/2014 | Muller | |
| 8,808,540 B2 | 8/2014 | Johnson | |
| 8,808,543 B2 | 8/2014 | Reid | |
| 8,840,783 B2 | 9/2014 | Zha et al. | |
| 9,181,107 B2 | 11/2015 | Reid | |
| 2003/0015469 A1 | 1/2003 | Hedenland et al. | |
| 2003/0070986 A1 | 4/2003 | Braun | |
| 2003/0111402 A1 | 6/2003 | Baig et al. | |
| 2004/0222158 A1 | 11/2004 | Husain et al. | |
| 2004/0256315 A1 | 12/2004 | Boyd et al. | |
| 2006/0272198 A1 | 12/2006 | Yoon et al. | |
| 2007/0187329 A1 | 8/2007 | Moller et al. | |
| 2008/0029395 A1 | 2/2008 | Fan | |
| 2010/0051546 A1 | 3/2010 | Vuong | |
| 2011/0100908 A1 | 5/2011 | Stephenson | |
| 2011/0192794 A1 | 8/2011 | Chidambaran et al. | |
| 2011/0272335 A1 | 11/2011 | Cote | |
| 2012/0145611 A1* | 6/2012 | Smith ..................... | C02F 3/301 210/150 |
| 2012/0181229 A1 | 7/2012 | Shinohara et al. | |
| 2015/0368131 A1* | 12/2015 | Garrido Fernandez ..................... | C02F 3/301 210/605 |
| 2016/0115057 A1 | 4/2016 | Tanaka et al. | |
| 2016/0115286 A1 | 4/2016 | Clough et al. | |
| 2017/0087518 A1 | 3/2017 | Volmering et al. | |

FOREIGN PATENT DOCUMENTS

| | | | |
|---|---|---|---|
| RU | 2135420 | 8/1999 | |
| RU | 2259959 | 9/2005 | |
| RU | 75651 | 8/2008 | |
| RU | 2351551 | 4/2009 | |
| RU | 2403959 | 11/2010 | |
| WO | 01036338 | 5/2001 | |
| WO | WO-03037805 A1 * | 5/2003 | ............ C02F 3/1247 |
| WO | WO2010058187 A2 | 5/2010 | |
| WO | 11043144 A1 | 4/2011 | |

OTHER PUBLICATIONS

Ryabchikov B.E., Sovremennye metody podgotovki vody dlya promyshlennogo i bytovogo ispolzovaniya, Moskva, DeLi prin, 2004, pp. 165-185.
MicroSepTec EnviroServer ES Series Specification Book, Revised Sep. 2011; Accessible at http://www.microseptec.com/images/pdfs/booklets/ES%20Spec%20Book.pdf.
Review of Technologies for the Onsite Treatment of Wastewater in California prepared for the California State Water Resources Control Board; Prepared by Harold Leverenz, et al., Aug. 2002, Part I.
Review of Technologies for the Onsite Treatment of Wastewater in California prepared for the California State Water Resources Control Board; Prepared by Harold Leverenz, et al., Aug. 2002, Part 2.
Review of Technologies for the Onsite Treatment of Wastewater in California prepared for the California State Water Resources Control Board; Prepared by Harold Leverenz, et al., Aug. 2002, Part 3.
Review of Technologies for the Onsite Treatment of Wastewater in California prepared for the California State Water Resources Control Board; Prepared by Harold Leverenz, et al., Aug. 2002, Part 4.
Review of Technologies for the Onsite Treatment of Wastewater in California prepared for the California State Water Resources Control Board; Prepared by Harold Leverenz, et al., Aug. 2002, Part 5.
Review of Technologies for the Onsite Treatment of Wastewater in California prepared for the California State Water Resources Control Board; Prepared by Harold Leverenz, et al., Aug. 2002, Part 6.
Review of Technologies for the Onsite Treatment of Wastewater in California prepared for the California State Water Resources Control Board; Prepared by Harold Leverenz, et al., Aug. 2002, Part 7.
Review of Technologies for the Onsite Treatment of Wastewater in California prepared for the California State Water Resources Control Board; Prepared by Harold Leverenz, et al., Aug. 2002, Part 8.
Review of Technologies for the Onsite Treatment of Wastewater in

(56) References Cited

OTHER PUBLICATIONS

California prepared for the California State Water Resources Control Board; Prepared by Harold Leverenz, et al., Aug. 2002, Part 9.

* cited by examiner

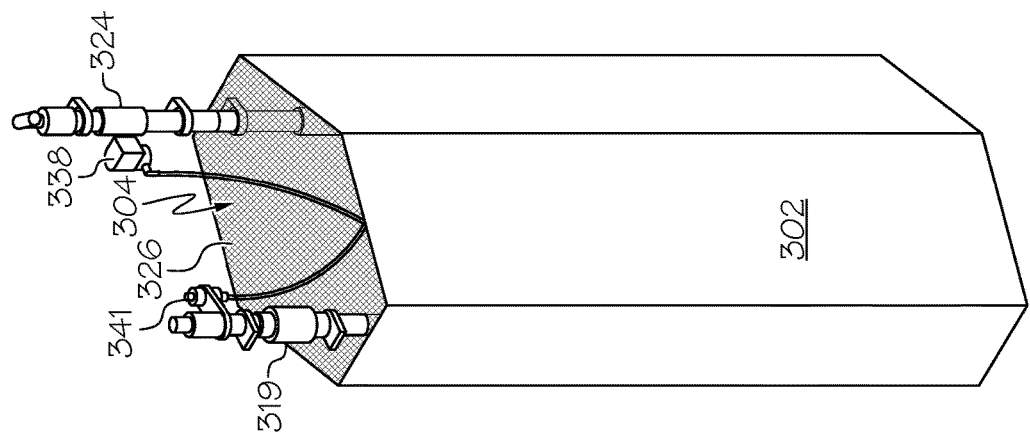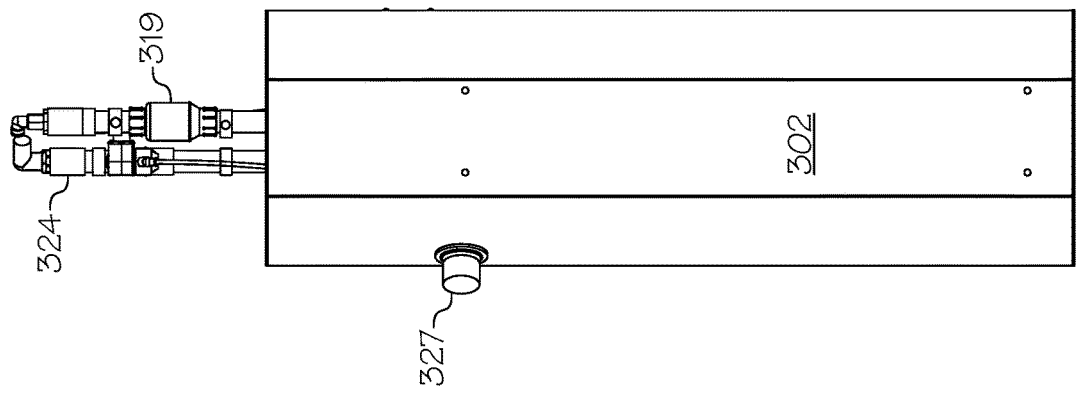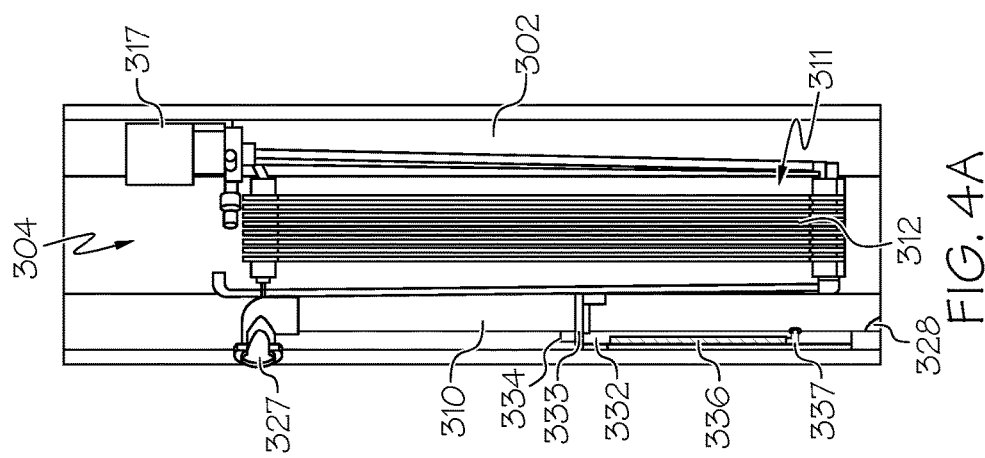

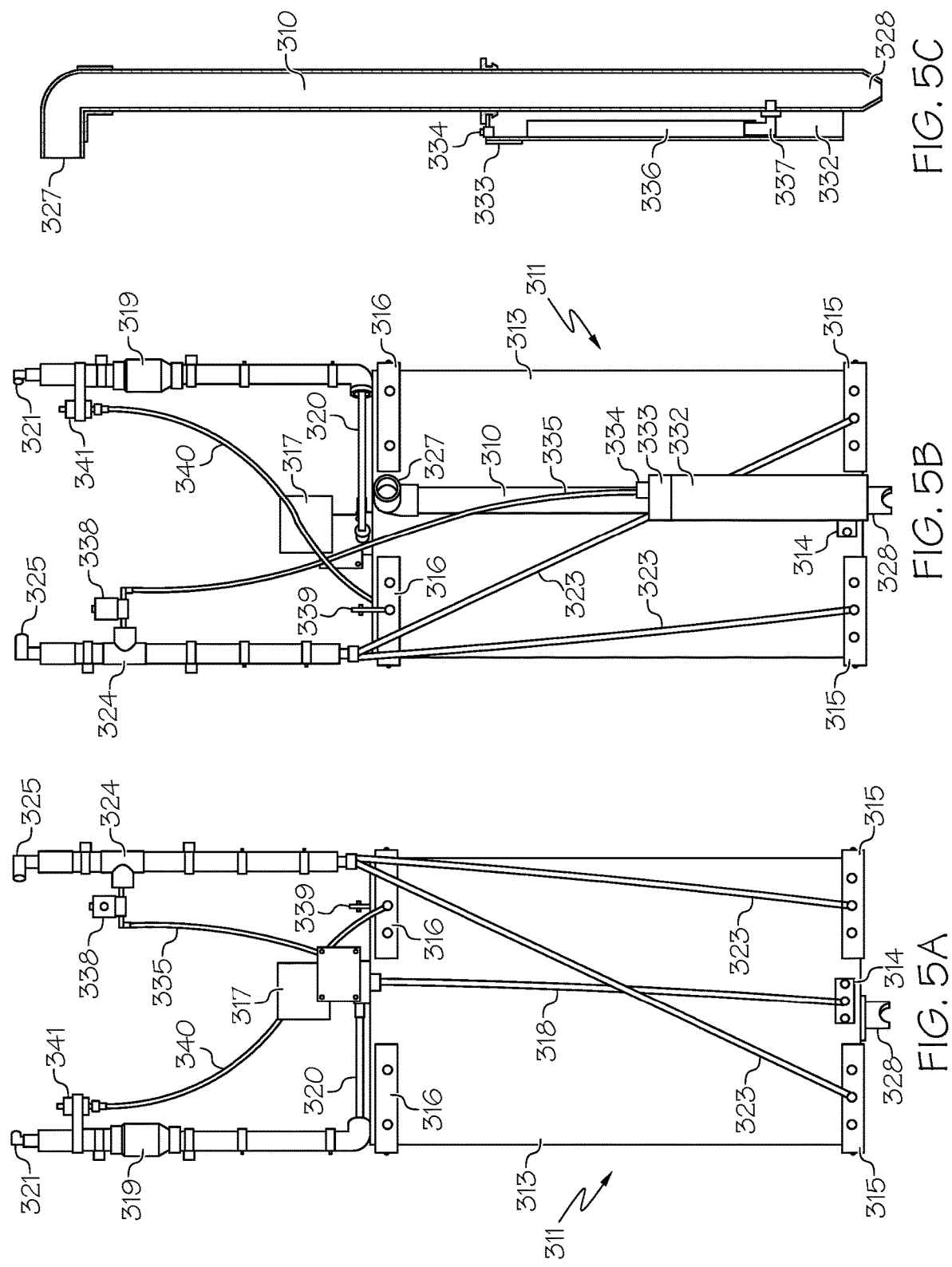

HOME SEWAGE TREATMENT SYSTEM

This application claims benefit of priority of U.S. Provisional Patent Application Ser. No. 62/467,479, filed Mar. 6, 2017, which is incorporated herein by reference in its entirety.

FIELD

The invention relates to a tank and system for treating wastewater, and in particular, with the aid of a tank having separate anoxic and equalization chambers and/or a tank having separate aerobic and filtration chambers.

BACKGROUND

Home sewage treatment systems (HSTSs) can be installed in residential homes in order to permit surface discharge of treated wastewater. HSTSs are believed to be a more popular choice for new decentralized wastewater treatment installations as compared to traditional septic systems because subsurface discharge is less desirable from a cost, aesthetic, and an observations/measurement perspective.

Unfortunately, there is a high failure rate of existing surface discharge systems. A prevalent cause of failure is an underperforming system that results in the exceedance of discharge water quality limits. Accordingly, there is an unmet need for a reliable HSTS that meets the water quality limits consistently.

HSTSs are preferably installed underground. Therefore, it is desirable to minimize the space that the HSTS occupies without sacrificing performance. Furthermore, it is desirable for the components of the HSTS to be as easily accessible as possible in order to allow maintenance to occur. Minimizing the complexity of the components of the HSTS allows maintenance to be easier and can minimize space. Furthermore, minimizing the connections and the complexity of the connections between operations helps in minimizing the space that the HSTS occupies and allows maintenance to be performed easily. Combining multiple HSTS functions into one apparatus allows for minimizing the space the HSTS occupies and reduces the number of apparatuses that require maintenance. Because HSTSs can be used in the residential setting, the above features can also reduce the cost of the system and any installation and maintenance associated with the system.

SUMMARY

Described herein is an equalization tank with an equalization zone and an anoxic zone in the form of a tub contained therein, for example, for use in an HSTS. The HSTS can also have an anaerobic zone, an aerobic zone, and a filtration zone. Wastewater to be treated can be fed to the anaerobic zone and proceeds from the anaerobic zone to the equalization zone to the anoxic zone to the aerobic zone to the filtration zone in the HSTS system. There is optionally a recycle stream from the aerobic zone to the equalization and/or anoxic zone. Also optionally, the aerobic zone and the filtration zone are contained in a single aerobic/filtration tank. The anaerobic zone also can be a primary-treatment zone that allows separation via the physical processes of sedimentation and flotation. An example system includes three tanks: a primary-treatment and anaerobic tank ("anaerobic tank"), an equalization and anoxic tank ("equalization/anoxic tank"), and an aerobic and filtration tank ("aerobic/filtration tank"). The aerobic/filtration tank includes a sub-tank or sub-compartment (hereinafter "filtration sub-tank") that separates the aerobic zone from the filtration zone. Also described herein is an equalization/anoxic tank that can be utilized in any existing system that has an anoxic zone and an aerobic/filtration tank that can be utilized in any existing system that has an aerobic zone, a filtration zone, or both.

In a first aspect, there is a tank that includes:

a tank inlet, a tank outlet, and a tank internal volume;

an anoxic tub, the anoxic tub divides the internal volume of the tank into an anoxic chamber inside the anoxic tub and an equalization chamber outside of the anoxic tub;

the anoxic chamber in the anoxic tub contains anoxic media for anoxically treating the wastewater.

In an example of aspect 1, the anoxic tub includes walls that separate the equalization chamber from the anoxic chamber.

In another example of aspect 1, the anoxic tub includes an anoxic-chamber inlet that connects the anoxic chamber to the equalization chamber.

In another example of aspect 1, the anoxic-chamber inlet includes at least one opening, for example a slot or hole, in a wall of the anoxic tub.

In another example of aspect 1, the anoxic-chamber inlet includes a mechanism to prevent the anoxic media from entering the equalization chamber.

In another example of aspect 1, the at least one opening in the wall of the anoxic tub has an average diameter less than the greatest diameter of the anoxic media in the anoxic chamber.

In another example of aspect 1, the anoxic tub includes an anoxic-chamber outlet connected to an anoxic pump positioned in the anoxic tub, wherein the pump transfers wastewater out of the anoxic chamber through the anoxic-chamber outlet.

In another example of aspect 1, the equalization chamber includes a level switch in communication with a controller for controlling operation of the anoxic pump.

In another example of aspect 1, the level switch functions to stop operation of the anoxic pump at a fluid level in the tank that ensures the anoxic chamber is submerged by the wastewater in the tank.

In another example of aspect 1, the anoxic chamber includes a first end and a second end, the anoxic-chamber inlet being near the first end of the anoxic chamber and the anoxic-chamber outlet being near the second end of the anoxic tub such that there is a flow gradient within the anoxic chamber from the first end of the anoxic chamber to the second end of the anoxic chamber.

In another example of aspect 1, the tank inlet is in fluid communication with the equalization chamber.

In another example of aspect 1, the tank outlet is in fluid communication with the anoxic chamber.

In another example of aspect 1, the tank outlet is in fluid communication with the anoxic pump.

In another example of aspect 1, the equalization chamber has a volume at least twice, preferably at least four times, as large as that of the volume of the anoxic chamber.

In another example of aspect 1, the volume ratio of the equalization chamber to the anoxic chamber being at least 1.5:1.

In a second aspect, there is provided the tank of aspect 1 as part of a system for treating wastewater, wherein the system includes:

an anaerobic tank, and an aerobic and filtration tank;

the anaerobic tank including an anaerobic chamber, the anaerobic chamber for anaerobically treating the wastewater;

the aerobic and filtration tank including:

an air source, a filtration sub-tank that divides an internal volume of the aerobic and filtration tank into a filtration chamber inside the filtration sub-tank and an aerobic chamber outside of the filtration sub-tank;

the aerobic chamber including an aerobic aeration conduit connected to the air source and aerobic media for aerobically treating the wastewater;

the filtration chamber including a filtration unit that includes at least one membrane having a permeate section, a filtration aeration conduit connected to the air source, and a permeate pipe connected to the permeate section of the at least one membrane.

In an example of aspect 2, the anoxic tub includes an anoxic-chamber outlet connected to an anoxic pump that can pump wastewater out of the anoxic chamber through the anoxic-chamber outlet to the aerobic chamber through an anoxic conduit.

In another example of aspect 2, the system includes an anaerobic conduit connecting the anaerobic chamber to the equalization chamber, wherein the wastewater from the anaerobic chamber flows into the equalization chamber through the anaerobic conduit.

In another example of aspect 2, the wastewater in the equalization chamber flows into the anoxic chamber through an opening in the anoxic tub.

In another example of aspect 2, the system includes a permeate pump to draw the wastewater in the aerobic chamber into the filtration chamber.

In another example of aspect 2, the system includes an aerobic recycle conduit connecting the aerobic chamber to the equalization chamber.

In a third aspect, there is provided a method of treating wastewater including a tank, the tank includes an anoxic tub that divides an internal volume of the tank into an anoxic chamber inside the anoxic tub and an equalization chamber outside of the anoxic tub, the method including:

feeding wastewater to the equalization chamber;

drawing wastewater from the equalization chamber to the anoxic chamber;

anoxically treating wastewater within the anoxic chamber producing anoxically treated wastewater;

removing anoxically treated wastewater from the anoxic chamber.

In an example of aspect 3, the method includes measuring the water level in the equalization chamber, pumping anoxically treated wastewater from the anoxic chamber if the measured water level is above a minimum water level, and not pumping anoxically treated wastewater from the anoxic chamber if the measured water level is at or below a minimum water level.

In another example of aspect 3, the method includes aerobically treating wastewater in an aerobic chamber producing aerobically treated wastewater, wherein the wastewater fed to the equalization chamber includes the aerobically treated wastewater.

In another example of aspect 3, the method includes anaerobically treating wastewater in an anaerobic chamber producing anaerobically treated wastewater, wherein the wastewater fed to the equalization chamber further includes the anaerobically treated wastewater.

In another example of aspect 3, the method includes pumping the anoxically treated wastewater from the anoxic chamber to the aerobic chamber.

In another example of aspect 3, the method includes delivering treated wastewater to a filtration chamber having a filtration membrane and operating a permeate pump to draw unfiltered wastewater through the filtration membrane producing filtered wastewater.

In another example of aspect 3, the method includes delivering oxygen to the aerobic chamber and a gas to the filtration chamber.

In another example of aspect 3, the method includes delivering air to the aerobic chamber and the filtration chamber.

In a fourth aspect, there is a tank for treating wastewater that includes:

a tank inlet, a tank outlet and a tank internal volume;

a filtration sub-tank positioned in the tank internal volume;

the filtration sub-tank including a filtration sub-tank inlet, a filtration sub-tank outlet and a filtration sub-tank internal volume;

the filtration sub-tank dividing the tank internal volume into an aerobic chamber outside of the filtration sub-tank and a filtration chamber inside the filtration sub-tank internal volume;

the filtration chamber including a membrane unit that includes at least one membrane for filtering wastewater received from the aerobic chamber and through the filtration sub-tank inlet, wherein the wastewater received from the aerobic chamber is discharged from the filtration chamber through the filtration sub-tank outlet and out the tank outlet;

an aerobic-aeration conduit connected to the aerobic chamber for delivering oxygen to the aerobic chamber, the aerobic-aeration conduit further connected to an oxygen source for delivering oxygen from the oxygen source to the aerobic chamber through the aerobic-aeration conduit to aerobically treat wastewater in the aerobic chamber;

a filtration-aeration conduit connected to the filtration chamber of the filtration sub-tank for delivering gas to the filtration chamber; the filtration-aeration conduit further connected to a gas source for delivering gas from the gas source to the filtration chamber to scour the at least one membrane;

a permeate pump for drawing wastewater in the filtration chamber through the at least one membrane to produce filtered wastewater.

In an example of aspect 4, the tank is adapted such that, while gas is being delivered to the filtration chamber from the gas source to scour the at least one membrane, the wastewater level in the filtration chamber does not exceed an open top area of the filtration chamber.

In another example of aspect 4, the filtration sub-tank internal volume is separated from the aerobic chamber by filtration sub-tank walls such that the only fluid communication between the aerobic chamber and the filtration chamber is through the filtration sub-tank inlet.

In another example of aspect 4, the filtration sub-tank outlet is directly connected to the tank outlet, wherein the tank outlet is not in fluid communication with the aerobic chamber except for through the filtration sub-tank.

In another example of aspect 4, the filtration sub-tank includes a top area that is open to the aerobic chamber, a controller to control the level of wastewater in the filtration chamber such that the wastewater level does not exceed a top area of the filtration chamber that is open to the aerobic chamber.

In another example of aspect 4, the tank includes a level transducer for indicating to the controller that the water level in the filtration chamber has reached a maximum level.

In another example of aspect 4, the tank includes a pump for feeding wastewater to the tank inlet, wherein the controller stops the pump from feeding wastewater to the tank inlet if the level transducer indicates that the water level in the filtration chamber has reached a maximum level.

In another example of aspect 4, the oxygen source is an air source and the gas source is an air source.

In another example of aspect 4, the filtration sub-tank inlet includes a filtration-chamber conduit with an inlet for receiving wastewater from the aerobic chamber and an outlet for delivering the wastewater from the aerobic chamber to the filtration chamber.

In another example of aspect 4, the aerobic chamber includes aerobic media for aerobically treating wastewater in the aerobic chamber.

In another example of aspect 4, the tank includes a recycle pump for recycling aerobically treated wastewater from the aerobic chamber to an anoxic chamber positioned upstream of the aerobic chamber.

In a fifth aspect, there is a system for treating wastewater that includes:
the tank of aspect 4, an anaerobic tank and an equalization and anoxic tank;
    the anaerobic tank including an anaerobic chamber for anaerobically treating wastewater;
    the anoxic tank including an equalization chamber and an anoxic chamber, the anoxic chamber including anoxic media for anoxically treating the wastewater;
    an anoxic pump for feeding anoxically treated wastewater from the anoxic chamber to the aerobic chamber;
    a recycle pump for recycling aerobically treated wastewater from the aerobic chamber to the anoxic chamber.

In an example of aspect 5, the filtration sub-tank includes a top area that is open to the aerobic chamber, a controller to control the operation of the anoxic pump such that the wastewater level in the filtration chamber does not exceed a top area of the filtration chamber that is open to the aerobic chamber.

In another example of aspect 5, the system includes a level transducer for indicating to the controller that the water level in the filtration chamber has reached a maximum level.

In a sixth aspect, there is a method of treating wastewater including:
    feeding wastewater to an aerobic chamber within a tank;
    feeding oxygen to the aerobic chamber;
    aerobically treating the wastewater in the aerobic chamber with aerobic media positioned in the aerobic chamber;
    passing the wastewater treated with the aerobic media from the aerobic chamber to a filtration chamber of a filtration sub-tank positioned within the tank;
    operating a permeate pump to draw wastewater in the filtration chamber through a membrane within the filtration chamber;
    feeding a gas to the filtration chamber to scour the membrane, the gas being delivered to the filtration chamber by a filtration-aeration conduit connected to the filtration chamber;
    preventing the wastewater level in the filtration chamber from exceeding a top area that is open to the aerobic chamber while the gas is being fed to the filtration chamber.

In an example of aspect 6, the method includes creating a flow gradient within the filtration chamber such that wastewater is drawn into the filtration chamber from the aerobic chamber through a filtration-chamber conduit in the filtration sub-tank, wherein the flow gradient prevents wastewater from flowing from the filtration chamber to the aerobic chamber.

In another example of aspect 6, operating the permeate pump creates the flow gradient within the filtration chamber.

In another example of aspect 6, the prevention step results from ceasing the feeding of wastewater to the aerobic chamber if a water level in the filtration chamber reaches a maximum level.

In another example of aspect 6, the gas fed to the filtration chamber includes oxygen, wherein the oxygen in the feeding oxygen to the aerobic chamber step is in the form of air fed at 0.5 to 3.5 scfm.

In another example of aspect 6, the gas in the feeding gas to the filtration chamber step is in the form of air fed at 5.0 to 10.0 scfm.

In another example of aspect 6, the method includes recycling aerobically treated wastewater to an anoxic chamber.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

The accompanying drawing is included to provide a further understanding of principles of the disclosure, and is incorporated in and constitutes a part of this specification. The drawing illustrates some examples(s), and together with the description serves to explain, by way of example, principles and operation thereof. It is to be understood that various features disclosed in this specification and in the drawing can be used in any and all combinations. By way of non-limiting example the various features may be combined with one another as set forth in the specification, above, as aspects.

BRIEF DESCRIPTION OF THE FIGURES

FIG. 4A shows a cross-section view of a filtration sub-tank and the components contained therein.

FIG. 4B shows a side view of a filtration sub-tank.

FIG. 4C shows a perspective view of a filtration sub-tank.

FIG. 5A shows a front view of a membrane unit and other components contained in a filtration sub-tank.

FIG. 5B shows a back view of a membrane unit and other components contained in a filtration sub-tank.

FIG. 5C shows a side view of a filtration-chamber conduit that is part of a membrane unit as shown in FIGS. 5A and 5B.

DETAILED DESCRIPTION

Figure 1:
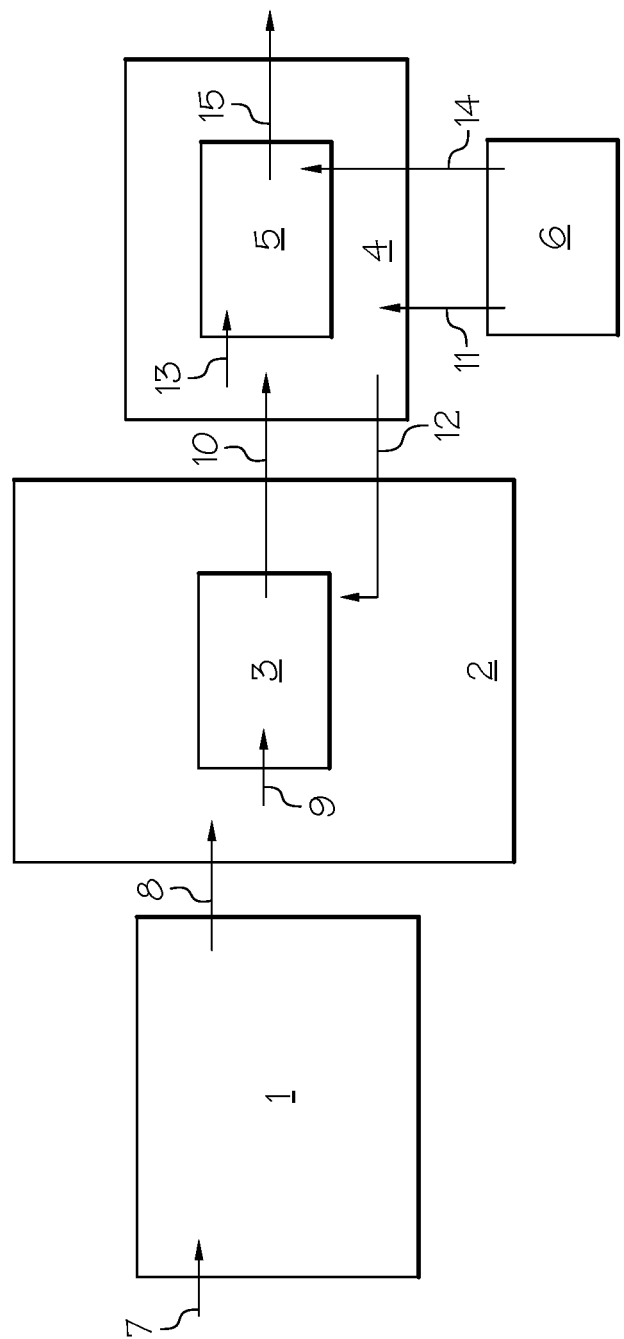
FIG. 1 shows a schematic flow diagram of an HSTS.

As described herein, a HSTS can include an anaerobic tank, an equalization/anoxic tank with an anoxic tub contained therein, and an aerobic/filtration tank.

The anaerobic tank has a tank inlet, a tank outlet, and an internal volume. The tank inlet is in fluid communication with a wastewater source for receiving wastewater, for example, raw wastewater. The anaerobic tank inlet is connected to a wastewater conduit through which wastewater is supplied or fed to the anaerobic tank, for example, by means of a wastewater pump. The anaerobic tank outlet is in fluid communication with the equalization/anoxic tank, for example, arranged downstream of and directly connected to the anaerobic tank. The anaerobic tank outlet can be connected to an anaerobic conduit through which effluent wastewater from the anaerobic tank can be fed to the equalization/anoxic tank. The internal volume of the anaerobic tank can include an anaerobic chamber serving as an anaerobic zone for holding and anaerobically treating wastewater. The tank inlet is preferably an anaerobic-chamber inlet connected to the wastewater conduit. The tank outlet is preferably an anaerobic-chamber outlet connected to the anaerobic conduit. The anaerobic-chamber outlet can be configured so that wastewater flows out of or discharges from the anaerobic chamber via gravity overflow to the equalization/anoxic tank. In another example, an anaerobic transfer pump can provide fluid flow out of the anaerobic chamber to the equalization/anoxic tank. The anaerobic chamber can also serve as a primary-treatment zone that can separate solids in the wastewater via physical processes such as sedimentation and flotation. Materials less dense than water, such as fats, oils, and greases, can float to the top of the wastewater held in the anaerobic chamber while materials more dense than water sink to the bottom of the anaerobic chamber.

The conditions of the anaerobic chamber are preferably such that they facilitate the growth of microorganisms that can anaerobically treat the wastewater. For example, the microorganisms in the anaerobic chamber can digest the heavy solid materials that sink to the bottom of the anaerobic chamber, breaking down large organic compounds first into smaller compounds such as sugars, amino acids, and fatty acids, and eventually into even smaller compounds such as carbon dioxide, hydrogen, methane, and ammonia. In operation, the water level in the anaerobic chamber can be above the anaerobic-chamber inlet and/or the anaerobic-chamber outlet such that water flow into and out of the anaerobic chamber does not disturb or unnecessarily mix the physical separation of the wastewater component layers therein via turbulence. As an example, the anaerobic-chamber inlet and anaerobic-chamber outlet can be conduits that extend vertically downward from the wastewater conduit and anaerobic conduit, respectively, with openings at the bottoms thereof. For example, the openings of the anaerobic-chamber inlet and anaerobic-chamber outlet can be 12 inches and 14 inches below the wastewater conduit and anaerobic conduit, respectively. The openings of the anaerobic-chamber inlet and anaerobic-chamber outlet are therefore lower than the wastewater conduit and anaerobic conduit. The water level in the anaerobic chamber will be maintained by the level of the anaerobic conduit. Because the openings of the inlet and outlet are lower than the water level in the chamber, flow into and out of the anaerobic chamber will not disturb the physical separation of the layers therein via turbulence, particularly the top layer. The anaerobic tank can have an access cover such that the anaerobic chamber can be accessed for maintenance and/or to allow floating and/or settled solids to be pumped out of the chamber. The anaerobic tank can have a vent that allows gases to escape the anaerobic chamber but prevents the ingress of insects or foreign bodies.

The equalization/anoxic tank has a tank inlet, a tank outlet, and an internal volume. The tank inlet is in fluid communication with the anaerobic tank for receiving wastewater therefrom, for example, the tank inlet is connected to the anaerobic conduit. The tank outlet is in fluid communication with an aerobic, filtration or aerobic/filtration tank. For example, the tank outlet can be connected to an anoxic conduit through which effluent wastewater from the equalization/anoxic tank can be fed to a downstream tank (e.g., aerobic/filtration tank). In the internal volume of the equalization/anoxic tank is an anoxic tub having its own internal volume. The anoxic tub can be arranged as desired in the equalization/anoxic tank, for example, the tub can rest against the bottom of the tank. The anoxic tub divides the internal volume of the tank into an anoxic chamber inside the anoxic tub, for instance the entire internal volume of the tub, and an equalization chamber outside of the tub, such as the entire remainder of the internal volume of the tank. The anoxic tub can be in the form of any structure or vessel that separates the internal volume thereof from the equalization chamber.

The anoxic tub can be a standalone tub contained within the equalization/anoxic tank or a fabricated tub created by one or more divider plates, for example a horizontal divider plate extending across the width and at least part of the length of the equalization/anoxic tank. If the divider plate does extend fully across the length of the tank, a vertical divider plate can extend downward from the end of the horizontal divider plate to the bottom of the tank, creating the fabricated tub. Any arrangement of length and width of the divider plate can be used and coupled with adjacent vertical plates extending to the bottom of the tank to form a sealed tub of a desired volume. The tank inlet is preferably an equalization-chamber inlet connected to the anaerobic conduit.

The equalization chamber is designed for holding wastewater, which can be a greater volume as compared to the anaerobic chamber. The size of the equalization chamber is such that variations in wastewater effluent from the wastewater source can be accommodated. In other words, the equalization chamber is designed to handle surges or a predetermined operating range of flows in wastewater effluent from the wastewater source by having a sufficient volume that can accommodate the increase in the total water volume of the system. In this regard, the equalization chamber helps to prevent the system from flooding or the overflowing of one or a combination of tanks or chambers in the system. The size of the equalization chamber also can accommodate downtime for the HSTS, for example for maintenance, power outage, or clogging. Furthermore, the equalization chamber facilitates better treatment in downstream processes by allowing for a more stable hydraulic retention time.

The volume of the equalization chamber can be at least the average total daily volume of wastewater added to the system. In this regard, if the system loses power or is down for maintenance the equalization chamber can handle at least one day's average wastewater volume without the system flooding. The volume of the equalization chamber can be at least half of the total volume of the internal volume of the equalization/anoxic tank, for example, the volume of the equalization chamber can be 50, 60, 70, 80 or 90 percent of the total volume of the tank. In this regard, the volume of the equalization chamber is preferably at least as large as the volume of the anoxic chamber. This increases the overall efficiency of the system, requiring less anoxic media than would be required if the anoxic chamber were larger. In an example, the volume of the equalization chamber is at least two-thirds of the total volume of the internal volume of the equalization/anoxic tank. As compared to the anoxic chamber, the volume of the equalization chamber can be at least twice as large as the volume of the anoxic chamber, for example, the volume of the anoxic chamber can be less than 60, 50, 40, 30, 20 or 10 percent of the volume of the equalization chamber. In another example, the volume of the equalization chamber is at least three-fourths of the total volume of the internal volume of the equalization/anoxic tank. In this regard, the volume of the equalization chamber is preferably at least three times as large as the volume of the anoxic chamber. The equalization chamber can contain a level switch or a level switch tree containing multiple level switches for measuring the water level within the equalization chamber. The purpose of these level switches is described below in connection with the anoxic chamber.

In addition to the anoxic chamber, the anoxic tub contains a tub inlet and a tub outlet. The tub inlet is in fluid communication with the equalization chamber for receiving wastewater directly from the equalization chamber. The tub inlet is preferably an anoxic-chamber inlet through which wastewater enters the anoxic chamber from the equalization chamber. The tub outlet can be in fluid communication with the tank outlet of the equalization/anoxic tank, thereby in fluid communication with the aerobic/filtration tank. The tub outlet is preferably an anoxic-chamber outlet through which wastewater leaves the anoxic chamber, for example, the wastewater can proceed to a downstream treatment stage such as an aerobic or filtration stage. The anoxic chamber can contain anoxic media for facilitating the growth of microorganisms that can anoxically treat the wastewater. For example, the microorganisms in the anoxic chamber can convert nitrates to nitrogen gas.

The walls of the anoxic tub keep the anoxic chamber separated from the remainder of the equalization chamber. For example, the anoxic chamber and equalization chamber can be completely separated except for an anoxic-chamber inlet allowing wastewater to flow from the equalization chamber to the anoxic chamber. The anoxic-chamber inlet can be an opening or a plurality of openings in a wall of the anoxic tub, for example, on a portion of a top surface of the anoxic tub. The anoxic-chamber inlet can also constitute an equalization chamber outlet. The anoxic chamber can have a mechanism to prevent the anoxic media from escaping the anoxic chamber and entering the equalization chamber. For example, the anoxic-chamber inlet is sized so that the anoxic media cannot fit through the inlet. If the anoxic-chamber inlet is at least one opening in a wall of the anoxic tub, the at least one opening has an average or maximum diameter less than the greatest diameter of the anoxic media such that the anoxic media cannot fit through the at least one opening. In another example, the at least one opening in a wall or divider plate that forms the anoxic tub can include a screen or wire mesh for preventing anoxic media from leaving the tub.

The anoxic tub can include an anoxic pump, for example, housed in a pump chamber, capable of pumping wastewater from the anoxic chamber and through its outlet. The pump chamber can be arranged at least partially within the anoxic tub. In an example, the pump chamber can extend vertically through the equalization chamber towards the top of the equalization/anoxic tank and have an opening at the top thereof for providing access to the anoxic pump. The anoxic pump can be connected to an anoxic conduit that proceeds from the pump chamber, through the equalization chamber, to the outside of the equalization/anoxic tank, and into the aerobic/filtration tank. The pump chamber can have at least one opening constituting a pump-chamber inlet and an anoxic-chamber outlet, allowing wastewater to proceed from the anoxic chamber to the pump chamber. Preferably, the opening(s) prevents anoxic media from entering the pump chamber. For example, the opening(s) can be smaller than the anoxic media. The anoxic pump draws wastewater from the pump chamber and can transfer the wastewater through the anoxic conduit to the aerobic/filtration tank. In such an arrangement, the inlet of the anoxic conduit can constitute the tank outlet for the equalization/anoxic tank.

In operation, as wastewater proceeds from the pump chamber into the anoxic pump, wastewater is drawn into the pump chamber from the anoxic chamber through the anoxic-chamber outlet/pump-chamber inlet. As wastewater is drawn out of the anoxic chamber through the anoxic-chamber outlet/pump-chamber inlet, wastewater in the anoxic chamber is drawn toward the anoxic-chamber outlet/pump-chamber inlet. This results in wastewater being drawn into the anoxic chamber from the equalization chamber through the anoxic-chamber inlet. The drawing of wastewater out of the anoxic chamber creates a flow gradient within the anoxic chamber from the anoxic-chamber inlet to the anoxic-chamber outlet. The relative positions of the anoxic-chamber outlet and the anoxic-chamber inlet can be arranged such that the flow gradient within the anoxic chamber is directed from one end of the anoxic chamber to an opposite end of the anoxic chamber. Having the flow gradient extend across the length of the anoxic chamber reduces or eliminates stagnant flow areas within the anoxic chamber, which ensures that most or all of the wastewater therein is drawn across anoxic media, and is thus anoxically treated, and exits the anoxic chamber. To achieve the desired flow gradient, the anoxic-chamber outlet and anoxic-chamber inlet are preferably at opposite ends of the anoxic chamber. In an alternative embodiment, the anoxic pump can be outside and downstream of the anoxic chamber outlet, but in fluid communication with the anoxic chamber such that the pump can draw anoxically treated wastewater out of the anoxic chamber through an anoxic-chamber outlet to be delivered by the pump downstream. The anoxic pump can be connected to a controller that is also connected to the level switch(es) positioned in the equalization chamber. A first level switch can be at a minimum water level for keeping the anoxic tub fully submerged. The controller can be programmed to only allow the anoxic pump to operate and pump water if the water level in the equalization chamber is above a set minimum water level measured by the first level switch. Thus, the water level in the equalization chamber can be maintained such that the anoxic tub and the anoxic media contained therein remains submerged in water during operation of the tank. In this regard, the wastewater contained in the anoxic chamber is not exposed to oxygen in air that could be contained in the headspace of the equalization/anoxic tank. Because the anoxic chamber is not exposed to oxygen in the air, anoxic environmental conditions exist in the anoxic chamber that promote the growth of the denitrifying microorganisms on the anoxic media for converting nitrates to nitrogen gas. A second level switch can be at a level above the first level switch and can be used to indicate that the level of wastewater is approaching the level of the first level switch. When the wastewater level reaches the second level switch, the controller can reduce the volumetric flow rate of the anoxic pump as the level of wastewater in the equalization chamber approaches the level of the first level switch. The anoxic pump thus continues to deliver anoxically treated wastewater to the aerobic chamber while allowing for more time until the wastewater level reaches the level of the first level switch. This allows for more time for the equalization chamber to be filled up with wastewater from the anaerobic chamber. Thus, the frequency with which the anoxic pump is turned off is minimized is a result of the second level switch. A third level switch can be at a maximum or near maximum level for wastewater in the equalization tank. When the wastewater level reaches the second level switch, the controller can turn off the recycle pump (described in more detail below) that delivers aerobically treated wastewater to the equalization/anoxic tank. Thus, the amount of wastewater being fed to the equalization/anoxic tank is reduced, allowing the anoxic pump to reduce the amount of wastewater in the equalization chamber.

The equalization/anoxic tank has at least one access cover such that the equalization, anoxic, and pump chambers can be accessed for maintenance and/or to allow settled solids to be pumped out of the chambers. Additionally, either or both of the equalization chamber and anoxic chamber can be connected to sludge return conduits that can remove settled solids at the bottom of the chambers and deliver them to another location, such as the anaerobic chamber.

The aerobic/filtration tank has a tank inlet, a tank outlet, and an internal volume. The tank inlet can be in fluid communication with the anoxic chamber for receiving wastewater therefrom. The tank outlet can be in fluid communication with a treated wastewater conduit through which treated wastewater is emitted. In the internal volume of the aerobic/filtration tank is a filtration sub-tank having its own inlet, outlet, and internal volume. The filtration sub-tank divides the internal volume of the aerobic/filtration tank into a filtration chamber inside the filtration sub-tank, specifically the internal volume of the filtration sub-tank, and an aerobic chamber outside of the filtration sub-tank, specifically the remainder of the internal volume of the aerobic/filtration tank. The tank inlet can be an aerobic-chamber inlet. In an example, the aerobic-chamber inlet is an outlet of the anoxic conduit such that the aerobic chamber receives anoxically treated wastewater from the anoxic chamber. The aerobic chamber can contain aerobic media for facilitating the growth of microorganism that can aerobically treat the wastewater. For example, the microorganisms in the aerobic chamber can assist in oxidizing ammonia to nitrites, oxidizing nitrites to nitrates, and oxidizing organic matter to carbon dioxide. To assist in these oxidation reactions, dissolved oxygen is supplied to the aerobic chamber via at least one aerobic-aeration conduit in fluid communication with a gaseous oxygen source, preferably air. The at least one aerobic-aeration conduit can deliver oxygen to the bottom of the aerobic chamber where microorganisms on the aerobic media can use the oxygen therein to aerobically treat wastewater. The oxygen is preferably delivered at a rate that results in the dissolved oxygen concentration being especially suited for aerobic microbial growth and the oxidation reactions. The preferred dissolved oxygen concentration in the aerobic chamber is from about 2.0 to about 4.0 mg/L. An example flow rate of air to achieve this dissolved oxygen concentration is about 0.5 to about 3.5 scfm. In addition to directly assisting in promoting oxidation of wastewater, the oxygen source can also assist in keeping the media fully in suspension in the aerobic chamber to promote sufficient mixing energy without shearing biofilm from the media surface. The aerobic chamber can have a recycle pump connected to an aerobic recycle conduit for recycling aerobically treated wastewater containing nitrates back to the anoxic chamber for conversion of the nitrates to nitrogen gas by the microorganisms therein. The recycle pump can deliver aerobically treated liquid to the equalization chamber, preferably in proximity to the anoxic-chamber inlet, or directly to the anoxic chamber. In an example, the recycle pump is positioned at the bottom of the aerobic chamber so that aerobically-treated wastewater is recycled to the anoxic chamber.

The filtration sub-tank is made up of walls that substantially separate the internal volume of the filtration chamber, i.e. the filtration chamber, from the aerobic chamber. Preferably, there are only two openings in the filtration sub-tank. The first opening, which is preferably in a side wall of the filtration sub-tank, allows for wastewater to enter the filtration chamber from the aerobic chamber, as described in more detail below. The second opening, which is preferably at the top area of the filtration sub-tank, allows for the headspace of the filtration chamber to be in fluid communication with the headspace of the aerobic chamber. In this regard, gases in the wastewater of the filtration chamber that proceed to the headspace of the filtration chamber can escape to the headspace of the aerobic chamber and out of the aerobic/filtration tank. Furthermore, the second opening allows the level of wastewater in the filtration chamber to be the same as the level of wastewater in the aerobic chamber. The filtration chamber has a filtration unit for filtering wastewater. The filtration unit has a membrane system that removes suspended solids and microorganisms in wastewater. The membrane system includes at least one membrane unit, but preferably includes a plurality of membrane units. Each membrane unit includes at least one membrane for filtering wastewater. The membranes can be of any type suitable for filtering wastewater. In one example, the membrane system includes a series of filter cassette assemblies each made up of a support frame with the open area inside the frame enclosed on both sides by membrane sheets to create a permeate section therebetween. A series of spacers can connect the filter cassette assemblies to one another while at the same time creating spaced flow channels therebetween. Any number of spacers can be used. Filtered wastewater is drawn into a permeate section of the membranes by a permeate pump. Each permeate section is in fluid communication with a permeate conduit inside the membrane system. In an example, the permeate conduit can be a permeate pseudo-conduit created by one set of spacers that connect the cassette assemblies to one another. This permeate pseudo-conduit can have openings connecting it to each permeate section of each cassette assembly. The permeate conduit is connected to the permeate pump via a permeate tube such that when the permeate pump is operated, the permeate conduit delivers permeate to the pump through the permeate tube. The permeate is then pumped by the pump through a permeate stand pipe, which is connected to the outlet of the filtration-sub tank, e.g. a permeate outlet tube. The permeate outlet tube is in fluid communication with the tank outlet of the aerobic/filtration tank. The permeate outlet tube is preferably directly connected to the tank outlet. The permeate outlet tube is more preferably the only component connected to the tank outlet, such that the only path to the tank outlet is to be filtered by the filtration unit and fed to the permeate outlet tube. In this regard, the tank outlet is not in fluid communication with any of the anaerobic chamber, equalization chamber, anoxic chamber, or aerobic chamber except for through the filtration chamber and thus the filtration sub-tank.

During operation of the filtration unit, wastewater is drawn through the membranes from the feed side to the permeate side of the membranes, leaving behind debris larger than the pore size of the membranes. Over time, this debris can accumulate on the feed side of the membranes, resulting in fouling. The filtration chamber can have a continuous air scour on the feed side of the membranes that assists in preventing membrane fouling. The air scour can be provided by a filtration-aeration conduit in fluid communication with a gas source, for example the same as the gaseous oxygen source for the aerobic chamber, which is preferably air. The filtration-aeration conduit delivers gas to the filtration chamber. In one example, the filtration-aeration conduit is in fluid communication with at least one filtration-aeration diffuser that delivers gas in close proximity to the membrane surfaces for providing the air scour. The diffusers deliver gas near the bottom of the membrane surfaces, so that the gas proceeds upwards through the membrane system, scouring the membranes with gas which dislodges debris and prevents fouling on the membranes while at the same time creating a flow gradient through the membrane system and thus the filtration chamber proceeding from the bottom of the filtration chamber towards the top of the filtration chamber. Alternatively, the filtration-aeration conduit can deliver air directly to the membrane surfaces for providing the air scour. In order to adequately scour the membrane, the gas preferably is delivered to the filtration chamber with a feed rate of 5.0 to 10.0 scfm. The filtration-aeration diffusers can deliver air to one or more sets of spacers that connect the cassette assemblies to one another. Each spacer can have one or more guides that direct air in various directions along the width of the membranes to ensure that fouling is prevented along the entire width of the membranes. A filtration-chamber conduit that passes through the filtration sub-tank serves as an inlet to the filtration chamber from the aerobic chamber. The filtration-chamber conduit can also serve as a geyser that operates as a sludge return path from the filtration chamber to the aerobic chamber for sludge that accumulates in the filtration chamber. For reasons discussed below, the inlet of the filtration-chamber conduit is preferably near the top of the filtration chamber. The inlet of the filtration-chamber conduit can be covered with a mesh cap that serves to prevent aerobic media from being drawn into the filtration chamber. The outlet of the filtration-chamber conduit is preferably near the bottom of the filtration chamber. In this regard, when the filtration-chamber conduit is operated as a geyser, sludge that accumulates in the bottom of the filtration chamber can be drawn into the filtration-chamber conduit and to the aerobic chamber.

In order to operate the filtration-chamber conduit as a geyser, the system has a geyser assembly that includes a geyser-assembly conduit, a first geyser-aeration conduit, and a second geyser-aeration conduit. The geyser-assembly conduit surrounds at least a portion of the filtration-chamber conduit and includes a cap with an opening that fits the outer diameter of the filtration-chamber conduit to create a liquid-tight seal around the filtration-chamber conduit. The first geyser-aeration conduit is in fluid communication with the gas source of the filtration chamber and is also connected to the geyser-assembly conduit. Thus, that gas can be delivered to the geyser-assembly conduit by the first geyser-aeration conduit. The second geyser-aeration conduit is within the geyser-assembly conduit and has a first opening constituting an inlet within the geyser-assembly conduit and a second opening constituting an outlet in fluid communication with the filtration-chamber conduit. To operate the geyser assembly, gas is delivered by the first geyser-aeration conduit to the geyser-assembly conduit. As a result of the cap, the gas fills the geyser-assembly conduit and eventually proceeds into the first opening (inlet) of the second geyser-aeration conduit, also filling this conduit. When the second geyser-aeration conduit is filled to the point that the gas reaches the second opening (outlet) of the conduit, the gas within the second geyser-aeration conduit and the gas within the geyser-assembly conduit quickly enters the filtration-chamber conduit through the second opening (outlet) of the second geyser-aeration conduit. Because of its density, the gas proceeds upwards through the filtration-chamber conduit and into the aerobic chamber. The movement of the gas creates a vacuum effect, which results in a geyser effect where water in the filtration chamber being drawn into the aerobic chamber through the filtration-chamber conduit, with the filtration-chamber conduit outlet behaving as a geyser inlet and the filtration-chamber inlet behaving as a geyser outlet. Because the geyser inlet is near the bottom of the filtration chamber, accumulated sludge at the bottom of the filtration chamber can be carried into the aerobic chamber via the geyser effect.

In normal operation of the HSTS, oxygen from the gaseous oxygen source is fed to the aerobic chamber and gas, preferably the same as the oxygen from the gaseous oxygen source, is fed to the filtration chamber. The gas that is fed to the filtration chamber could partially dissolve into the wastewater therein. If the gas source contains oxygen, dissolved oxygen could occur in the wastewater therein. Because, as discussed above, there is a desired level of dissolved oxygen in the aerobic chamber, it is undesirable for wastewater from the filtration chamber which could contain additional dissolved oxygen to proceed to the aerobic chamber, with the exception of during the operation of the geyser assembly. Thus, the arrangement of the filtration chamber within the aerobic chamber is preferably such that wastewater is prevented from proceeding from the filtration chamber to the aerobic chamber during normal operation of the HSTS (i.e., permeate pump is operating to produce filtered wastewater, aerobic-aeration conduit is delivered oxygen to the aerobic chamber, and filtration-aerobic conduit is delivering gas to the filtration chamber). As discussed above, preferably the only paths in which water can proceed from the filtration chamber to the aerobic chamber are through the filtration-chamber conduit and through the opening at the top area of the filtration chamber. During normal operation, the permeate pump operates to draw wastewater through the membrane sheets creating filtered wastewater, creating a flow gradient in the filtration chamber results in wastewater being drawn from the aerobic chamber to the filtration chamber through the filtration-chamber conduit. Thus, wastewater does not proceed from the filtration chamber to the aerobic conduit through this conduit when the permeate pump is operating. To prevent wastewater in the filtration chamber from proceeding to the aerobic chamber through the opening at the top of the filtration chamber, the wastewater level in the filtration chamber, and thus the aerobic chamber, are preferably kept below the top opening of the filtration chamber such that the only fluid communication between the aerobic chamber and the filtration chamber is through the inlet to the filtration chamber. The wastewater level in the filtration chamber can be monitored with a level transducer or level switch(es). The level transducer can be connected to a controller, either the same or a different controller than that connected to the level switch (es) in the equalization/anoxic tank. The controller can be connected to the pumps in the system, such as the anoxic pump, the recycle pump, and the permeate pump, in order to control operation of these pumps to ensure the level of wastewater in the filtration chamber remains below the top opening thereof while at the same time maintaining the level of wastewater in the filtration chamber remains above the top of the membrane cassette assemblies to ensure that they remains submerged in wastewater. For example, if the level of wastewater in the filtration reaches a minimum level (e.g., a level just above the top of the membrane cassette assemblies), the controller can cease operation of the recycle pump and/or the permeate pump, which stops wastewater in the aerobic chamber and the filtration chamber from being recycled and/or sent out of the system. Additionally, if the level of wastewater in the filtration chamber reaches a maximum level (e.g., a level near the top of the filtration chamber), the controller can cease operation of the anoxic pump, which stops new wastewater from being fed to the aerobic/filtration tank. Because the level of wastewater in the filtration chamber is the same as that of the aerobic chamber, the level transducer can be in either chamber. Other methods can be used to maintain the level of wastewater in the filtration chamber below the top area of the filtration sub-tank. For example, an overflow pipe can be used in the aerobic/filtration tank that drains water from the tank if the wastewater level reaches that of the overflow pipe. The overflow pipe can lead to another chamber within the system, such as the equalization chamber.

The aerobic/filtration tank can also have an access cover such that the aerobic chamber and the filtration chamber can be accessed for maintenance and to allow settled solids to be pumped out of the chambers. Additionally, either or both of the aerobic chamber and the filtration chamber can be connected to sludge return conduits that can remove settled solids at the bottom of the chambers and deliver them to another location, such as the anaerobic chamber.

Effluent from the system is treated wastewater, for example, the treated wastewater can meet standards for being discharged or emitted into the environment. Additionally, the treated wastewater can be sent to another system that further treats the wastewater to produce potable water. In this way, the system can be part of a larger recycle system for recycling treated wastewater back to a building, such as residence.

FIG. 1 depicts a schematic flow diagram detailing a system for treating wastewater using the operations disclosed herein. The system includes an anaerobic chamber 1, an equalization chamber 2, an anoxic chamber 3, an aerobic chamber 4, and a filtration chamber 5. Air is introduced to the operations via an air source 6. Raw wastewater 7 is fed to the anaerobic chamber 1, which anaerobically treats the raw wastewater 7 to produce anaerobically treated wastewater 8. This anaerobically treated wastewater 8 is fed to the equalization chamber 2, which serves to equalize flow fluctuations in the wastewater source and any downtime in the system. Equalized wastewater 9 proceeds to the anoxic chamber 3, which is a sub-chamber (e.g., formed by an anoxic tub) within the equalization chamber 2. The anoxic chamber 3 anoxically treats the equalized wastewater 9, producing anoxically treated wastewater 10, which is fed to the aerobic chamber 4. With assistance from an air stream 11 from air source 6, the aerobic chamber 4 aerobically treats wastewater, producing aerobically treated wastewater 12, which includes nitrates that can be converted to nitrogen gas in the anoxic chamber 3. Thus, the aerobically treated wastewater 12 is recycled to the anoxic chamber 3 to convert these nitrates to nitrogen gas. The aerobically treated wastewater 12 can be recycled directly to the anoxic chamber or, as depicted, to the equalization chamber 2 in the vicinity of the anoxic chamber 3. Wastewater that has been aerobically, anoxically, and aerobically treated (wastewater 13) proceeds to the filtration chamber 5. Air stream 14 from air source 6 prevents fouling in the filtration chamber 5, allowing a membrane unit therein to produce filtered wastewater 15, which exits the system.

Figure 2A:
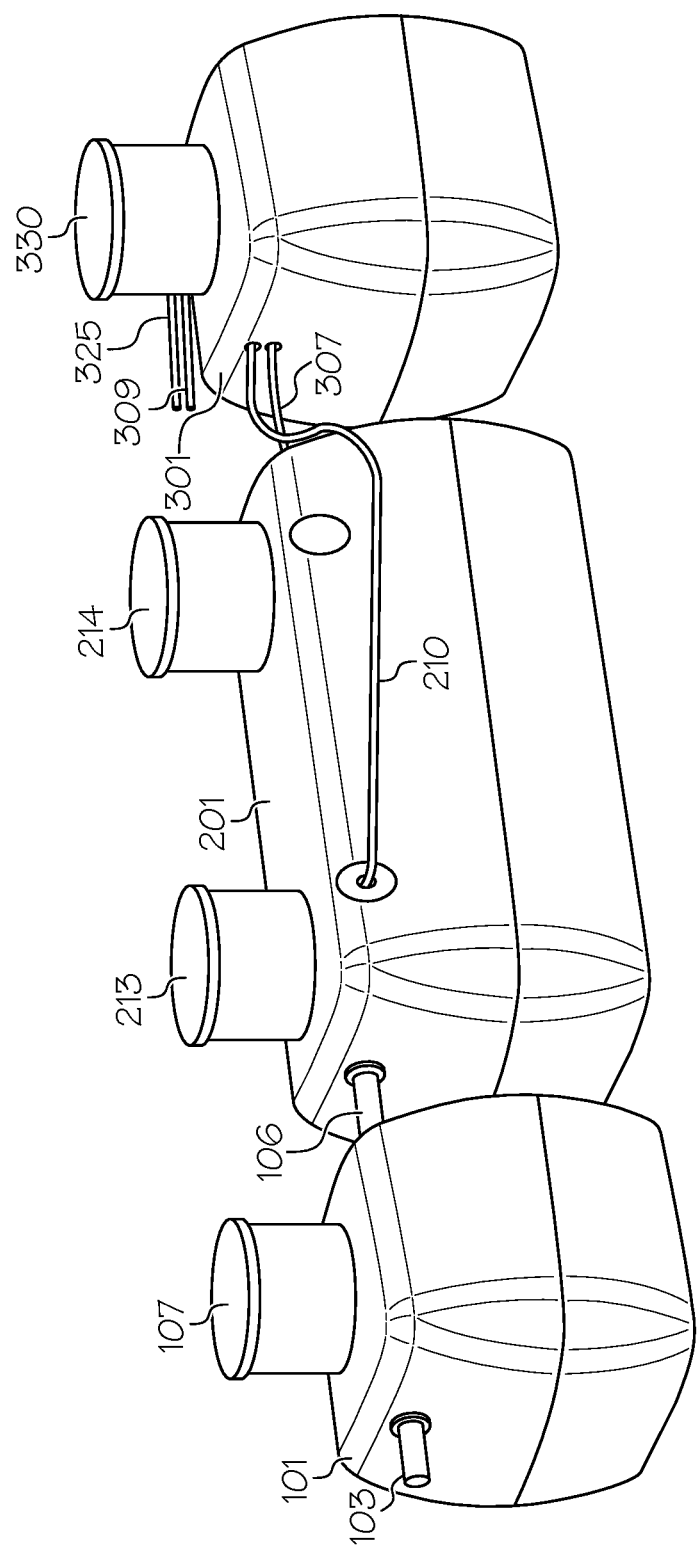
FIG. 2A shows a first perspective view of an HSTS.
Figure 2B:
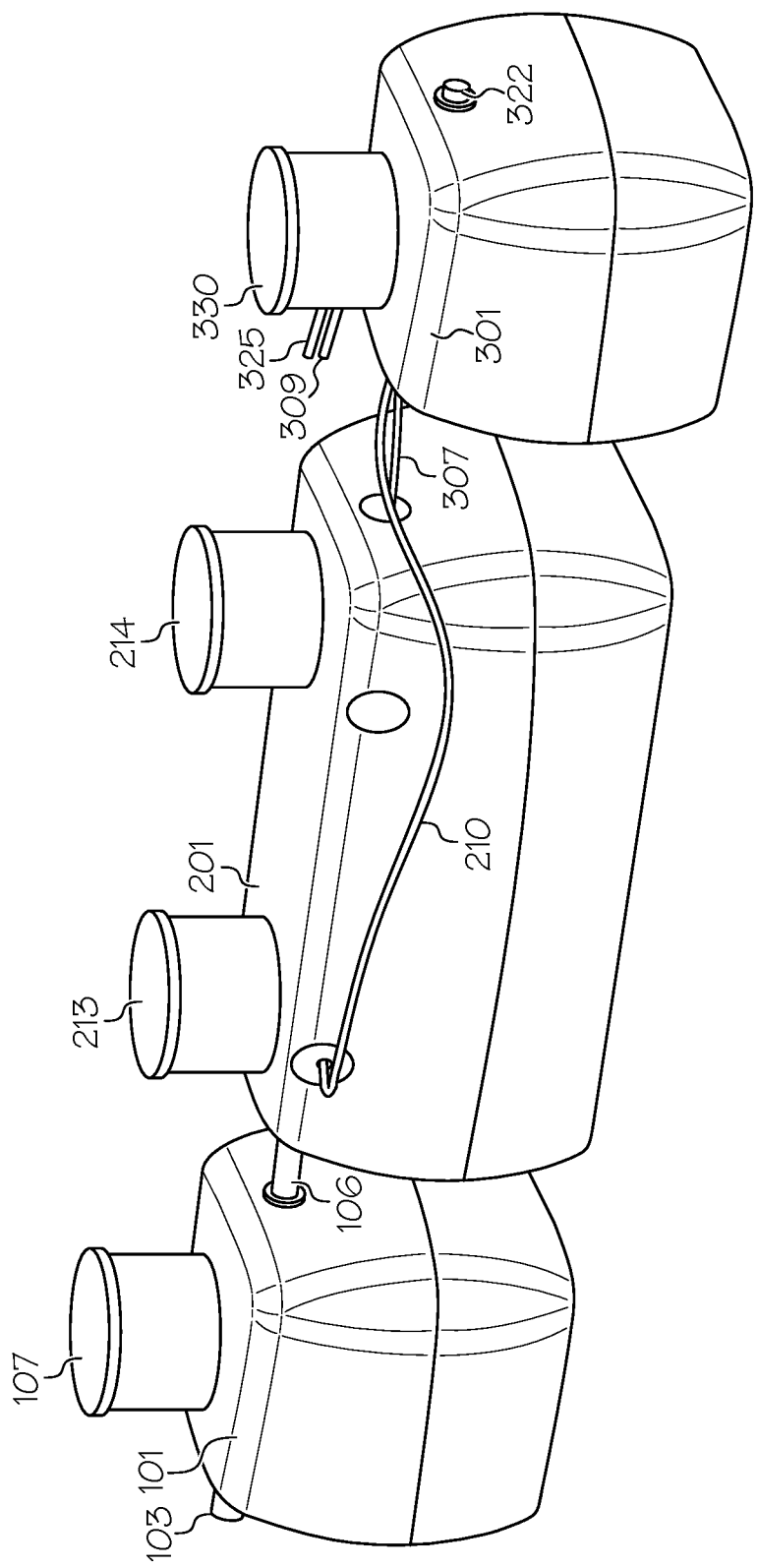
FIG. 2B shows a second perspective view of the HSTS shown in FIG. 2A.

FIGS. 2A and 2B depict a series of tanks for treating wastewater, including an anaerobic tank 101, an equalization/anoxic tank 201, and an aerobic/filtration tank 301. Raw wastewater is fed to the anaerobic tank 101 through wastewater conduit 103. Anaerobically treated wastewater proceeds through the anaerobic conduit 106 to the equalization/anoxic tank 201. Anoxically treated wastewater proceeds through the anoxic conduit 210 to the aerobic/filtration tank 301. Aerobically treated wastewater is recycled back to the equalization/anoxic tank 201 through aerobic recycle conduit 307. Filtered wastewater leaves the aerobic/filtration tank through treated wastewater conduit 322. Air is provided to the aerobic/filtration tank through aeration conduits 309 and 325. If maintenance needs to be performed, access covers 107, 213/214, and 330 provide access to the insides of the anaerobic tank 101, equalization/anoxic tank 201, and aerobic/filtration tank 103, respectively.

Figure 3A:
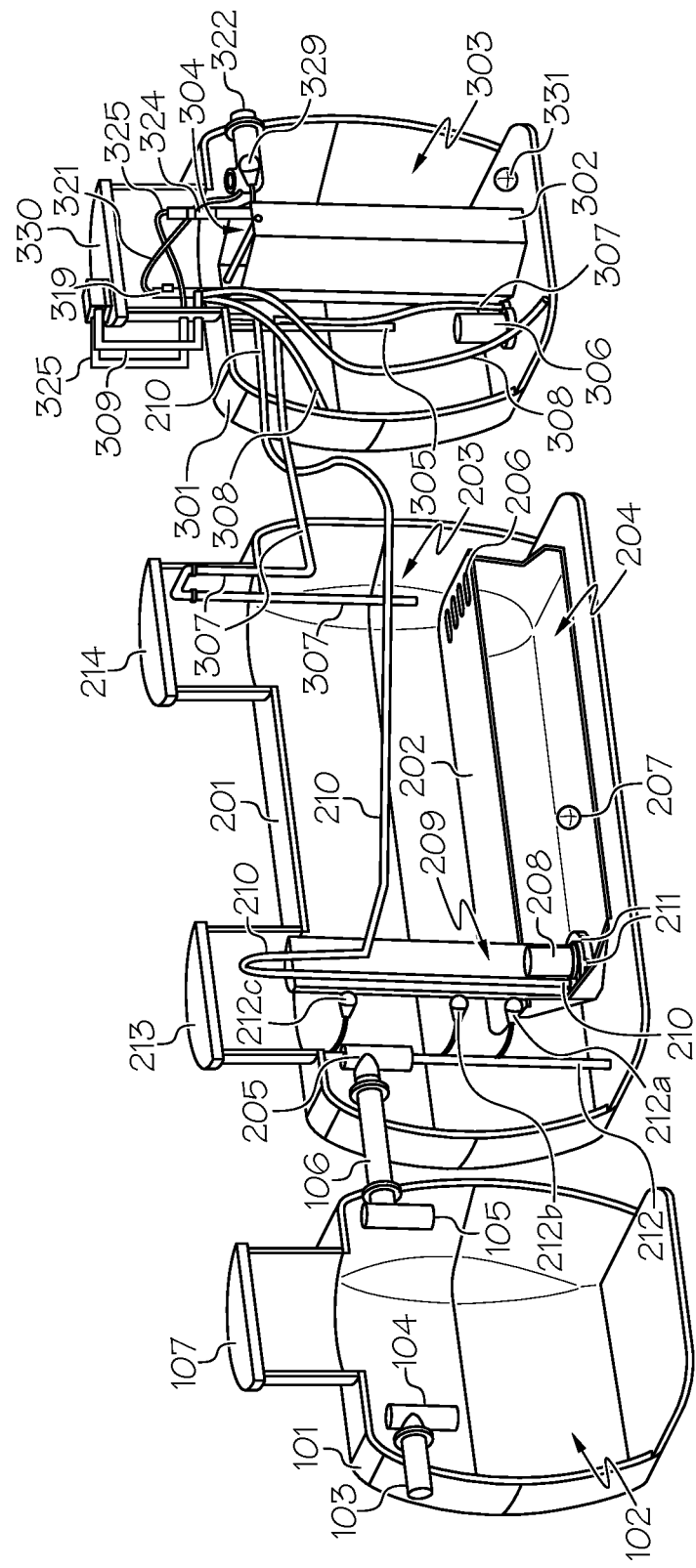
FIG. 3A shows a first cutaway perspective view of an HSTS.
Figure 3B:
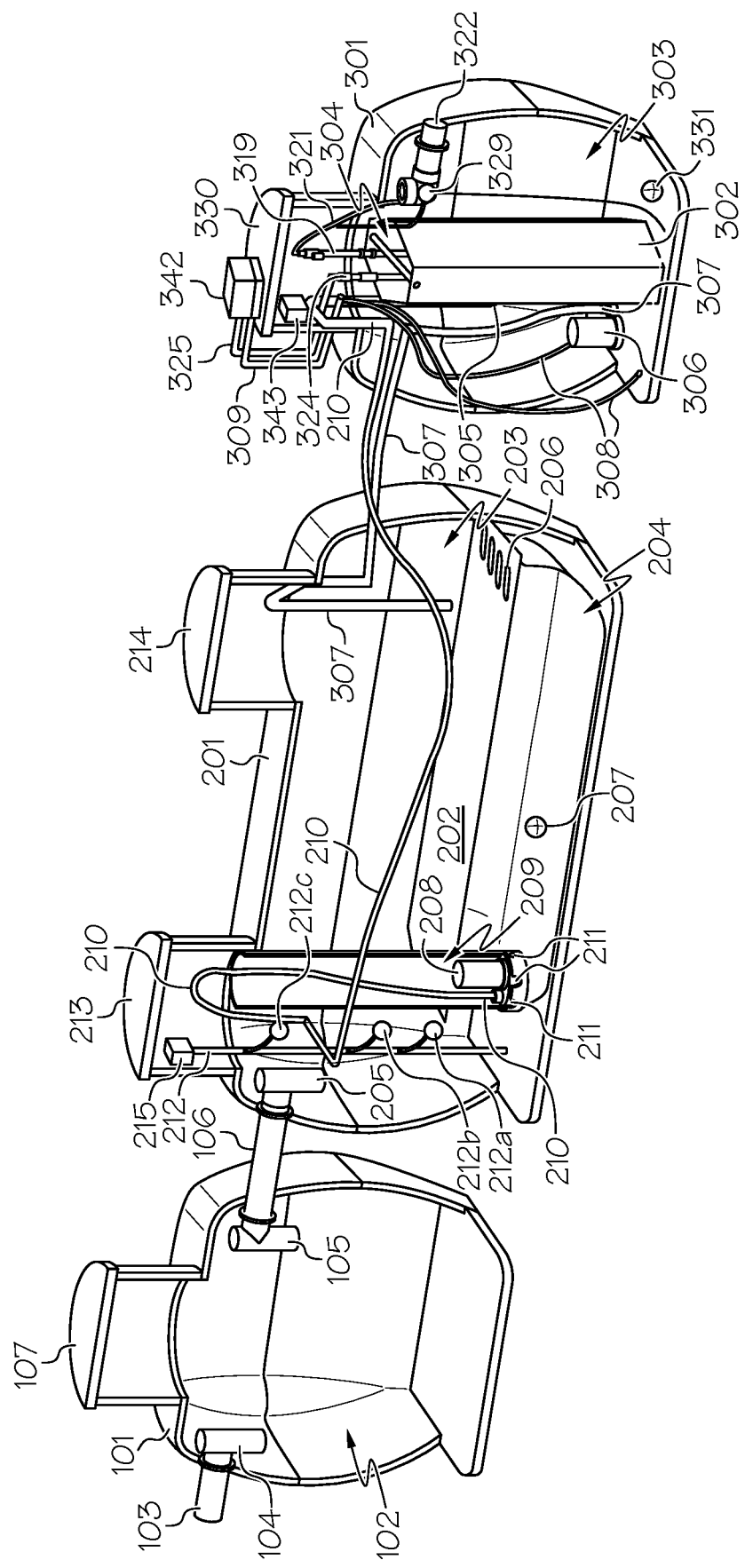
FIG. 3B shows a second cutaway perspective view of the HSTS shown in FIG. 3A.

FIGS. 3A and 3B depict the series of tanks shown in FIGS. 2A and 2B with a cutaway view so that the insides of the tanks can be seen. Inside the anaerobic tank 101 is anaerobic chamber 102 for anaerobically treating wastewater. Raw wastewater from the raw-wastewater conduit 103 enters the anaerobic chamber 102 through anaerobic-chamber inlet 104, which is connected to the raw-wastewater conduit 103. Anaerobically treated wastewater leaves the anaerobic chamber 102 through anaerobic-chamber outlet 105, which is connected to anaerobic conduit 106. Access cover 107 provides access to the anaerobic chamber 102 such that maintenance can be performed or solids accumulated therein can be removed.

Inside the equalization/anoxic tank 201 is an anoxic tub 202 that divides the internal volume of the tank into an equalization chamber 203 outside of the tub and an anoxic chamber 204 inside the tub. Anaerobically treated wastewater enters the equalization chamber 203 through the equalization-chamber inlet 205 which is connected to the anaerobic conduit 106. The anoxic tub 202 has openings 206 constituting an anoxic-chamber inlet 206. Anoxic media 207 facilitates the growth of microorganisms that anoxically treat wastewater in the anoxic chamber 204. An anoxic pump 208 housed in anoxic-pump chamber 209 pumps anoxically treated liquid through anoxic conduit 210. The anoxic-pump chamber 209 has a series of openings, constituting an anoxic-chamber outlet 211. In operation, the anoxic pump 208 draws water into the anoxic-pump chamber 209 from the anoxic chamber 204 through the anoxic-chamber outlet 211. This creates a flow gradient, which draws water across the anoxic chamber 204 from the end near anoxic-chamber inlet 206 to the end near the anoxic-chamber outlet 211. Water is then drawn into the anoxic chamber 204 through the anoxic-chamber inlet 206 from the equalization chamber 203. The equalization/anoxic tank 201 has a level switch tree 212 including a series of level switches 212a, 212b, and 212c connected to a controller 215. Using the measured water level in the equalization chamber 203, the controller controls the operation of the anoxic pump 208. In this regard, the controller can stop the anoxic pump 208 from operating if the level switch 212 indicates that the water level in the equalization chamber 203 has reaches a minimum water level. This allows the anoxic tub 202 to remain submerged in water at all times so that the water contained therein is not exposed to oxygen in air. Access covers 213 and 214 provide access to the equalization chamber such that maintenance can be performed or solids accumulated therein can be removed.

Inside the aerobic/filtration tank 301 is a filtration sub-tank 302 that divides the internal volume of the tank into an aerobic chamber 303 outside of the sub-tank and a filtration chamber 304 inside the sub-tank. The aerobic chamber 303 receives anoxically treated wastewater from an outlet of the anoxic conduit 210 constituting an aerobic-chamber inlet 305. Aerobically treated wastewater is recycled from the aerobic chamber 303 to the equalization chamber 203 using recycle pump 306 and aerobic recycle conduit 307. The outlet of the aerobic recycle conduit 307 is within the equalization chamber 203 but in close proximity to the anoxic-chamber inlet 206 so that aerobically treated wastewater rich in nitrates can be treated within the anoxic chamber 204. Inside the aerobic chamber 303, wastewater is aerobically treated using the combination of aerobic media 331 and oxygen in air from aerobic-aeration conduits 308 connected to an air source 342 through an aerobic-aeration conduit 309.

As shown in FIGS. 4A, 4B, 4C, 5A, 5B, and 5C a filtration-chamber conduit 310 connects the filtration chamber 304 to the aerobic chamber 303. Inside the filtration chamber 304 is a membrane unit 311 made up of a series of membrane cassette assemblies 312 having membrane sheets 313. As seen in the figures, the membrane cassette assemblies 312 are connected to one another with lower-middle spacers 314, lower-outer spaces 315, and upper spacers 316. However, any number of spacers can be used. Each membrane cassette assembly has a pair of membrane sheets 313 with a permeate section therebetween. The permeate sections are connected to one another through a permeate conduit which, for reasons discussed below, is within lower-middle spacers 314. A permeate pump 317 is connected to permeate sections of the membrane sheets 313 via a permeate tube 318. With these connections, operating the permeate pump 317 draws water to through the membrane sheets 313 to the permeate sections, producing filtered wastewater (permeate) that proceeds through the permeate tube 318 to the pump 317. The permeate pump 317 pumps permeate to a permeate stand pipe 319 through stand-pipe-connection tube 320. The permeate stand pipe 319 is connected to a permeate outlet tube 321, which is connected to treated wastewater conduit 322 through which treated wastewater exits the system. In order to prevent the membrane sheets 313 from fouling, air is delivered to filtration-aeration diffusers 323 which introduce air to the bottom of the membrane cassette assemblies 312 through lower-outer spacers 315. The filtration-aeration diffusers 323 are connected to aeration stand pipe 324, which is connected to an air source 342 through a filtration-aeration conduit 325. Air from the filtration-aeration diffusers 323 rises in the filtration chamber 304 until it bubbles out of the wastewater and exits through the top area 326 of the filter chamber and is open. As depicted, the top area 326 of the filtration chamber 304 has a mesh covering. This mesh covering can prevent aerobic media 331 from entering the filtration chamber 304. The operation of the permeate pump 317 creates a flow gradient within the filtration chamber 304, resulting in wastewater being drawn into the filtration chamber 304 through filtration-chamber conduit 310. This creates a flow gradient within the filtration-chamber conduit 310 such that wastewater is drawn into the conduit from the aerobic chamber 303 through its inlet 327 and leaves the conduit through its outlet 328. The filtration-chamber conduit 310 can also be operated as a geyser. To operate the filtration-chamber conduit 310 as a geyser, solenoid valve 338 opens, so that air from the air stand pipe 324 is fed to a geyser-assembly conduit 332 through a first geyser-aeration conduit 335. The first geyser-aeration conduit 335 is received by a geyser-aeration connection 334, which is received by a geyser cap 333. The geyser cap 333 provides a cover for the geyser-assembly conduit 332 and has an opening for receiving the filtration-chamber conduit 310. The geyser cap 333 has a liquid-tight seal around the filtration-chamber conduit 310 such that wastewater does not enter the geyser-assembly conduit 332 through the opening. The air fed to the geyser-assembly conduit 332 builds up therein because of the liquid-tight seal of the geyser cap 333. A second geyser-aeration conduit 336 is positioned within the geyser-assembly conduit 332 and has an opening at the top and bottom thereof. The bottom opening is connected to a geyser-assembly outlet fitting 337 that connects the second geyser-aeration conduit 336 to the filtration-chamber conduit 310. In operation, air fills the geyser-assembly conduit 332, lowering the level of air therein and filling the second geyser-aeration conduit 336. When the geyser-assembly conduit 332 and the second geyser-aeration conduit 336 are filled to the point that air reaches the geyser-assembly outlet fitting 337, a large portion of the air escapes into the filtration-chamber conduit 310, where it flows upwards out of the inlet 327 and into the aerobic chamber 303. This air flow creates a flow gradient that draws wastewater in the filtration chamber 304 into the filtration-chamber conduit 310 through the outlet 328, where it then flows through the filtration-chamber conduit 310 and out of the inlet 327 into the aerobic chamber. Because the outlet 328 is near the bottom of the filtration chamber 304, any debris in the filtration chamber 304 that sinks to the bottom (i.e., sludge) will also be drawn into the filtration-chamber conduit 310 and delivered to the aerobic chamber. This geyser, or sludge return, operation can be performed as often as needed. Preferably, air flow to the filtration-aeration diffusers 323 is stopped when the geyser operation is performed. In this regard, the effect of the geyser operation on the dissolved oxygen concentration in the aerobic chamber 303 is minimized. In order to ensure that the wastewater level in the filtration chamber 304 (as well as the aerobic chamber 303) remains below the top area 326 of the filtration chamber 304, a level transducer 329 measures the water level in the aerobic chamber 303. The level transducer 329 is connected to a controller 343, which controls the operation of the anoxic pump 209. In this regard, the controller 343 can stop the anoxic pump 208 from operating if the level transducer 329 indicates that the water level in the aerobic chamber 303 has reached a maximum water level. Additionally, the controller 343 can stop the recycle pump 306 and/or the permeate pump 317 from operating if the level transducer 329 indicated that the water level in the aerobic chamber has reached a minimum water level. This ensures that the membrane cassette assemblies 312 remain submerged in water. Access cover 330 provides access to the aerobic chamber 303 and the filtration chamber 304 such that maintenance can be performed or solids accumulated therein can be removed. During operation of the permeate pump 317 and the filtration-aeration diffusers 323 some dissolved air may be drawn through the membrane sheets 313 to the permeate sections of the membrane cassette assemblies 312. This dissolved gas can bubble out of the wastewater, leading to accumulated air at the top of the permeate sections. Thus, so that this accumulated air is not drawn into the permeate pump, the permeate conduit is at the bottom of the membrane cassette assemblies 312. In order to periodically let the accumulated air escape from the permeate sections, the membrane cassette assemblies can have an air bleed conduit within upper spacers 314 that is connected to each of the permeate sections. To allow the accumulated air to escape, the air bleed conduit can be connected to an air bleed valve 339, which can be a check valve that opens to allow air to be bled off. Additionally, the air bleed conduit can be connected to a pressure sensor conduit 340, which is connected to a pressure sensor 341 for measuring the pressure within the membrane unit 311, specifically the permeate pump suction pressure.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed:

1. A tank for treating wastewater comprising:
   a tank inlet, a tank outlet, and a tank internal volume;
   an anoxic tub comprising:
      walls that divide and separate the internal volume of the tank into an anoxic chamber inside the anoxic tub and an equalization chamber outside of the anoxic tub, the tank inlet being open to and in direct fluid connection with the equalization chamber for feeding wastewater into the equalization chamber, the anoxic chamber in the anoxic tub comprising anoxic media for anoxically treating wastewater received from the equalization chamber, the anoxic tub is positioned at the bottom of the tank internal volume and below a portion of the equalization chamber such that an entire internal volume of the anoxic tub is inside the equalization chamber,
      an anoxic-chamber inlet comprising at least one opening in one of the walls of the anoxic tub that directly connects the anoxic chamber to the equalization chamber, and
      an anoxic-chamber outlet connected to an anoxic pump that transfers wastewater out of the anoxic chamber through the anoxic-chamber outlet;
   an anoxic conduit connected to the anoxic pump, the anoxic conduit extending out of the tank internal volume such that the anoxic pump transfers wastewater from the anoxic chamber out of the tank internal volume through the anoxic conduit to an aerobic chamber for aerobically treating the wastewater.

2. The tank of claim 1, the at least one opening in one of the walls of the anoxic tub having an average diameter less than the greatest diameter of the anoxic media in the anoxic chamber to prevent the anoxic media from entering the equalization chamber.

3. The tank of claim 1, the anoxic chamber comprising a first end and a second end, the anoxic-chamber inlet being near the first end of the anoxic chamber and the anoxic-chamber outlet being near the second end of the anoxic tub such that there is a flow gradient within the anoxic chamber from the first end of the anoxic chamber to the second end of the anoxic chamber.

4. The tank of claim 1, the tank inlet being in fluid communication with the equalization chamber.

5. The tank of claim 1, the tank outlet being in fluid communication with the anoxic pump.

6. The tank of claim 1, a volume ratio of the equalization chamber to the anoxic chamber being at least 1.5:1.

7. The tank of claim 1, the anoxic tub rests against the bottom of the tank, wherein a level switch is in communication with a controller for controlling operation of the anoxic pump such that the level switch functions to stop operation of the anoxic pump at a fluid level in the tank that ensures the anoxic chamber is submerged by the wastewater in the equalization chamber to prevent exposure to oxygen in air, the level switch is positioned above the anoxic tub for keeping the anoxic tub fully submerged.

8. The tank of claim 1, the equalization chamber comprising a level switch in communication with a controller for controlling operation of the anoxic pump.

9. The tank of claim 8, the level switch functions to stop operation of the anoxic pump at a fluid level in the tank that ensures the anoxic chamber is submerged by the wastewater in the tank.

10. The tank of claim 9, the level switch positioned above the anoxic tub.

11. The tank of claim 1, further comprising an anoxic-pump chamber partially arranged within the anoxic tub and partially extending out of the anoxic tub through the equalization chamber, wherein the anoxic pump is housed within the anoxic-pump chamber.

12. The tank of claim 11, the anoxic-chamber outlet comprising at least one opening in the anoxic-pump chamber.

13. The tank of claim 12, the at least one opening in the anoxic-pump chamber having an average diameter less than the greatest diameter of the anoxic media in the anoxic chamber to prevent the anoxic media from entering the anoxic-pump chamber.

14. The tank of claim 1, the anoxic pump positioned inside an anoxic-pump chamber, the anoxic-pump chamber partially arranged within the anoxic tub.

15. A system for treating wastewater comprising:
   the tank of claim 1, an anaerobic tank, and an aerobic and filtration tank;
   the anaerobic tank comprising an anaerobic chamber, the anaerobic chamber for anaerobically treating the wastewater;
   the aerobic and filtration tank comprising:
   an air source,
   a filtration sub-tank that divides an internal volume of the aerobic and filtration tank into a filtration chamber inside the filtration sub-tank and the aerobic chamber outside of the filtration sub-tank;
   the aerobic chamber comprising an aerobic aeration conduit connected to the air source and aerobic media for aerobically treating the wastewater;
   the filtration chamber comprising a filtration unit comprising at least one membrane having a permeate section, a filtration aeration conduit connected to the air source, and a permeate pipe connected to the permeate section of the at least one membrane.

16. The system of claim 15, further comprising an anaerobic conduit connecting the anaerobic chamber to the equalization chamber.

17. The system of claim 15, further comprising a permeate pump to draw the wastewater in the aerobic chamber into the filtration chamber.

18. The system of claim 15, further comprising an aerobic recycle conduit connecting the aerobic chamber to the equalization chamber or the anoxic chamber.

19. A tank for treating wastewater comprising:
   a tank inlet, a tank outlet, and a tank internal volume;
   an anoxic tub comprising:
      walls that divide and separate the internal volume of the tank into an anoxic chamber inside the anoxic tub and an equalization chamber outside of the anoxic tub, the tank inlet being open to and in direct fluid connection with the equalization chamber for feeding wastewater into the equalization chamber, the anoxic chamber in the anoxic tub comprising anoxic media for anoxically treating wastewater received from the equalization chamber, the anoxic tub is positioned at the bottom of the tank internal volume and below a portion of the equalization chamber such that an entire internal volume of the anoxic tub is inside the equalization chamber, wherein a level switch is in communication with a controller for controlling operation of an anoxic pump such that the level switch functions to stop operation of the anoxic pump at a fluid level in the tank that ensures that the anoxic tub is submerged by the wastewater in the equalization chamber to prevent exposure of the anoxic media to oxygen in air, the level switch positioned above the anoxic tub for keeping the anoxic tub fully submerged, an anoxic-chamber inlet comprising at least one opening in one of the walls of the anoxic tub that directly connects the anoxic chamber to the equalization chamber, and an anoxic-chamber outlet connected to the anoxic pump positioned in the anoxic tub that transfers wastewater out of the anoxic chamber through the anoxic-chamber outlet;

an anoxic conduit connected to the anoxic pump, the anoxic conduit extending out of the tank internal volume such that the anoxic pump transfers wastewater from the anoxic chamber out of the tank internal volume through the anoxic conduit to an aerobic chamber for aerobically treating the wastewater.

* * * * *